(12) United States Patent
Williams

(10) Patent No.: US 8,864,439 B2
(45) Date of Patent: *Oct. 21, 2014

(54) TIDAL FLOW HYDROELECTRIC TURBINE

(75) Inventor: Herbert Williams, East Palatka, FL (US)

(73) Assignee: OpenHydro IP Limited, Dublin (IE)

( * ) Notice: Subject to any disclaimer, the term of this patent is extended or adjusted under 35 U.S.C. 154(b) by 750 days.

This patent is subject to a terminal disclaimer.

(21) Appl. No.: 12/373,486

(22) PCT Filed: Jul. 13, 2007

(86) PCT No.: PCT/EP2007/006235
§ 371 (c)(1),
(2), (4) Date: Jun. 25, 2009

(87) PCT Pub. No.: WO2008/006602
PCT Pub. Date: Jan. 17, 2008

(65) Prior Publication Data
US 2009/0278357 A1 Nov. 12, 2009

(30) Foreign Application Priority Data

Jul. 14, 2006 (EP) ..................................... 0601471

(51) Int. Cl.
*F03B 13/26* (2006.01)
*F16C 17/14* (2006.01)
*F16C 32/04* (2006.01)
*F03B 13/10* (2006.01)

(52) U.S. Cl.
CPC ......... *F16C 17/14* (2013.01); *F05B 2220/7066* (2013.01); *F05B 2240/53* (2013.01); *F16C 32/0423* (2013.01); *F05B 2220/7068* (2013.01); *Y02E 10/28* (2013.01); *F03B 13/10* (2013.01); *F03B 13/264* (2013.01)
USPC .......................................................... 415/3.1

(58) Field of Classification Search
USPC ............... 290/42, 43, 44, 53, 54, 55; 415/3.1, 415/170.1; 416/6
See application file for complete search history.

(56) References Cited

U.S. PATENT DOCUMENTS

| 228,467 A | 6/1880 | Maclay |
| 928,536 A | 7/1909 | Pino |

(Continued)

FOREIGN PATENT DOCUMENTS

| CA | 2388513 | | 8/2000 |
| CA | 2352673 | * | 1/2003 |

(Continued)

OTHER PUBLICATIONS

Kranert et al., Large diameter turbogenerator for generating electrical energy at high power, May 1988, Abstract of DE3638129.*

(Continued)

*Primary Examiner* — Liam McDowell
(74) *Attorney, Agent, or Firm* — Gardner, Linn, Burkhart & Flory, LLP

(57) ABSTRACT

A hydroelectric turbine for the production of electricity from tidal flow forces, the turbine having a rotor with an open center such that the blades are mounted between an inner rim and outer rim, wherein retaining members and anti-friction members are provided to limit movement of the rotor relative to the housing in either axial direction, such that water flow in either direction operates the turbine, but wherein the retaining members and the anti-friction members allow the rotor to shift in either axial direction in response to water flow. The anti-friction members limiting rotor travel in the axial direction are preferably of increased thickness, such that as the anti-friction members wear down, the rotor is able to shift relative to the housing in the axial direction.

14 Claims, 5 Drawing Sheets

(56) References Cited

U.S. PATENT DOCUMENTS

| | | |
|---|---|---|
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,496,845 A | 1/1985 | Ensign et al. |
| 4,523,878 A | 6/1985 | Richart et al. |
| 4,541,367 A * | 9/1985 | Lindberg .................. 123/25 M |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,517,383 A | 5/1996 | Webb |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,894,416 B1 | 5/2005 | Leijon et al. |
| 6,957,947 B2 | 10/2005 | Williams |
| 6,995,479 B2 | 2/2006 | Tharp |
| 6,998,730 B2 * | 2/2006 | Tharp .......................... 290/54 |
| 7,190,087 B2 * | 3/2007 | Williams ..................... 290/53 |
| D543,495 S | 5/2007 | Williams |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2004/0262926 A1 | 12/2004 | Hansen |
| 2005/0005592 A1 | 1/2005 | Fielder |
| 2005/0031442 A1 | 2/2005 | Williams |
| 2005/0073151 A1 | 4/2005 | Diamontopoulos |
| 2006/0261597 A1 | 11/2006 | Gehring |
| 2007/0018459 A1 | 1/2007 | Williams |
| 2007/0063448 A1 | 3/2007 | Kowalczyk |
| 2007/0231072 A1 | 10/2007 | Jennings et al. |
| 2007/0291426 A1 | 12/2007 | Kasunich et al. |
| 2008/0012538 A1 | 1/2008 | Stewart et al. |
| 2010/0025998 A1 | 2/2010 | Williams |
| 2010/0026002 A1 | 2/2010 | Spooner |
| 2010/0068037 A1 | 3/2010 | Ives |
| 2010/0172698 A1 | 7/2010 | Ives et al. |
| 2010/0201129 A1 | 8/2010 | Holstein et al. |
| 2010/0232885 A1 | 9/2010 | Ives et al. |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2011/0291419 A1 | 12/2011 | Dunne et al. |
| 2011/0293399 A1 | 12/2011 | Dunne et al. |
| 2011/0298216 A1 | 12/2011 | Ives et al. |
| 2011/0304148 A1 | 12/2011 | Dunne et al. |
| 2012/0027522 A1 | 2/2012 | Ives et al. |
| 2012/0175877 A1 | 7/2012 | Ives et al. |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | * 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |

(56) References Cited

FOREIGN PATENT DOCUMENTS

| | | |
|---|---|---|
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | WO9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | WO03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | WO2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | WO2006029496 | 3/2006 |
| WO | 2007043894 | 4/2007 |
| WO | WO2007055585 | 5/2007 |
| WO | 2007083105 | 7/2007 |
| WO | WO2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | 2010118766 A1 | 10/2010 |
| WO | 2011039249 | 4/2011 |
| WO | 2011039255 | 4/2011 |
| WO | 2011039267 | 7/2011 |

OTHER PUBLICATIONS

PCT International Search Report for International Application No. PCT/EP2007/006235 dated Nov. 20, 2007.
PCT Written Opinion of the International Searching Authority (Nov. 20, 2007).
PCT International Preliminary Report on Patentability including claims 1-13 as amended with demand for examination.
Request for Processing of International Application (Jul. 13, 2007).
U.S. Appl. No. 13/133,235, filed Jun. 7, 2011, including the specification, claims and drawings.
U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including specification, claims and drawings.

* cited by examiner

TIDAL FLOW HYDROELECTRIC TURBINE

BACKGROUND OF THE INVENTION

This invention relates generally to the field of turbines or power plants that produce electricity from fluid flow, either air or water, and more particularly relates to such devices wherein the fluid flow causes rotation of a propeller-type or impeller-type rotor, with the rotation being transferred to generators to produce the electricity. Even more particularly, the invention relates to such devices wherein the rotor is an open center rotor capable of rotation in either direction in response to the water flow direction encountered in rising and falling tides.

Production of electricity using hydroelectric or wind-powered turbines is well known. The fluid flow causes rotation of a propeller-type rotor or blades. For wind-powered turbines, the devices are located in areas with steady air currents, and the devices are typically rotated so as to be oriented in the optimum direction for capturing the wind energy. For hydroelectric turbines, the devices are usually placed in fast moving water currents, typically as part of a dam structure. Such water flow conditions are known as high head conditions.

While most turbines are constructed to have a central rotating shaft, that is held in place by oil lubricated bearings, onto which the blades or runners are mounted, it has been found that open-centered turbine constructions can have benefits not found with turbines having centralized shafts. Turbines having open-centered rotors, where the blades are mounted between inner and outer annular rings or rims and where the energy is transferred through the outer rim, can be successful in low head conditions, i.e., in slower currents. This is due to several reasons, including the fact that elimination of the central shaft and centralized blade portions reduces drag and the fact that larger diameter rotors can be produced since weight is reduced, thereby increasing the surface area contacting the low head flow. Another benefit to open-centered turbines in hydroelectric applications is that since water flow through the central portion of the turbine is not obstructed by blades, fish are able to pass through. Examples of such open center turbines can be seen in U.S. Pat. No. 5,592,816 issued Jan. 14, 1997, and reissued as RE38,336 on Dec. 2, 2003, U.S. Pat. No. 6,648,589 issued Nov. 18, 2003, U.S. Pat. No. 6,729,840 issued May 4, 2004, and U.S. Patent Appl. Publication US2005/0031442 published Feb. 10, 2005 (Ser. No. 10/633,865).

Because the fluid flow in these turbines is unidirectional, the force applied against the blades and rotors is also unidirectional. Thus, to date it has only been necessary to address frictional issues on the down-stream or down-wind side of the rotor where the outer rim is retained by the housing, since the flow will exert pressure in only one direction. In open-centered turbines it is the trailing edge of the outer rim that must be supported by the housing, while the leading edge of the outer rim is not subjected to down-stream or down-wind pressure.

Examples of turbines subject to bidirectional fluid flow can be seen in U.S. Pat. No. 4,421,990 to Heuss et al., U.S. Pat. No. 6,168,373 to Vauthier, U.S. Pat. No. 6,406,251 to Vauthier, U.K. Patent No. 2,408,294 to Susman et al., and WIPO International Publication WO 03/025385 to Davis et al.

It is an object of this invention to provide a hydroelectric turbine or power plant that is operational in bi-directional water flow without requiring physical reversal of the turbine, where bi-directional flow comprises flow in one direction over a certain time period and reversed flow in the opposite direction over a subsequent time period. It is a further object to provide such a turbine capable of producing electricity in bidirectional tidal flow applications. It is a further object to provide such a turbine wherein the rotor is able to shift in the axial direction, and in particular as the water lubricated axial bearings wear, such that the operational cycle of the turbine between replacement of bearings is greatly extended. It is a further object to provide such a turbine wherein the axial shifting of the rotor within the housing allows debris trapped between the rotor and the housing to be swept away. It is a further object to provide such a turbine wherein the axial shifting of the rotor within the housing results in less force being required to initiate rotation.

SUMMARY OF THE INVENTION

The invention is a device for the creation of electricity from a turbine operated by tidal flow or other bi-directional reversing water flow, where bi-directional water flow encompasses flow in a first direction over a first time period, such as a rising tide, followed by flow in the opposite direction over a following time period, such as a falling tide, with this cycle continuing. Such water flow is typically a low head condition, in that the current or water movement is not fast flowing or concentrated.

The methodology comprises locating an open-centered hydroelectric turbine or power plant within the tidal flow, such that the bi-directional tidal flow operates the turbine and produces electricity with water flow in either direction without having to reverse the orientation of the turbine. The turbine comprises a rotor or rotating assembly defined by at least one set of rotating blades or similar propeller-type or impeller-type structures mounted within a stationary housing, the blades preferably being disposed between an interior annular rim and an exterior annular rim, such that a relatively large open center is defined that contains no structure. The water flow imparts rotation to the rotor and this energy is transferred to one or more generators to create electricity, or the rotor and housing itself is constructed to operate as a generator, wherein for example magnets are located along the perimeter of the outer rim and coils are located along the perimeter of the housing encircling the outer rim.

In order to account for water flow in opposing directions, it is necessary to provide bearing or anti-friction means to reduce contact and friction between the outer rim and the annular retaining flanges of the housing in both the inflow and outflow directions. In the preferred embodiment, journals and preferably water lubricated marine bearing plates are utilized to minimize rotational friction between the edges of the outer rim and the retaining flanges of the housing. In the most preferred embodiment, the bearing plates and/or the journals restricting movement in the axial directions are of increased thickness, such that the device remains operational over an extended period of time as these bearings/journals wear away, the rotor being able to shift in the axial direction in response to the direction of water flow.

DETAILED DESCRIPTION OF THE INVENTION

With reference to the drawings, the invention will now be described in detail with regard for the best mode and the preferred embodiment. In a most general sense, the invention is a device for producing electricity, referred to generally as a hydroelectric turbine or power plant, from low head bi-directional or reversing water flow, particularly and primarily bidirectional water flow resulting from tidal flow, i.e., the cycling movement of water between high tide and low tide conditions.

Figure 1:
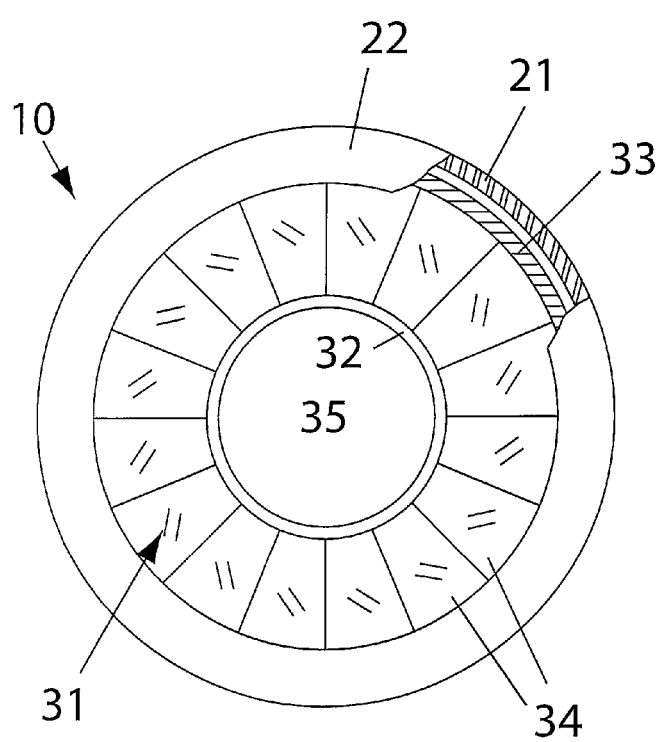
FIG. 1 is a view of the hydroelectric turbine as seen from the axial perspective.
Figure 2:
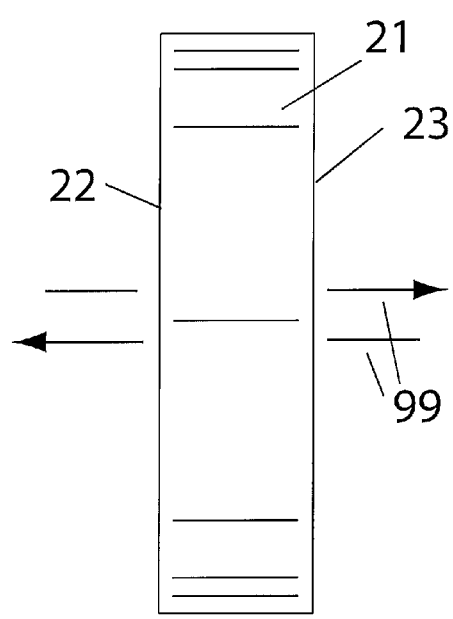
FIG. 2 is a view of the hydroelectric turbine as seen perpendicularly to the axial direction.

As shown generally in FIGS. 1 and 2, a preferred embodiment of the invention is an open-centered hydroelectric turbine 10 comprising a generally annular housing 21. The configuration of housing 21 shown is not meant to be limiting, as other configurations are possible provided the housing 21 accomplishes among other purposes retaining the rotating assembly or rotor 31 concentrically therein while permitting limited axial displacement of the rotor 31, in addition to allowing rotation of the rotor 31 about the rotational axis in both directions, and allowing transfer of the rotational energy to mechanically driven generator means 42 or actual participation in the production of electricity, such as by a combination of magnets 51 and coils 52. Housing 21 comprises a first retaining flange 22 and a second retaining flange 23 positioned on either side of an interior periphery surface 24 that together cooperate to define a limiting or retaining means which are dimensioned to permit limited axial movement of the rotor 31 in either axial direction, such flanges 22 and 23 preferably being annular in nature and each providing a generally planar interior surface facing the sides of the rotor 31. Alternatively, the retaining flanges 22 and 23 need not be continuous members.

Figure 5:
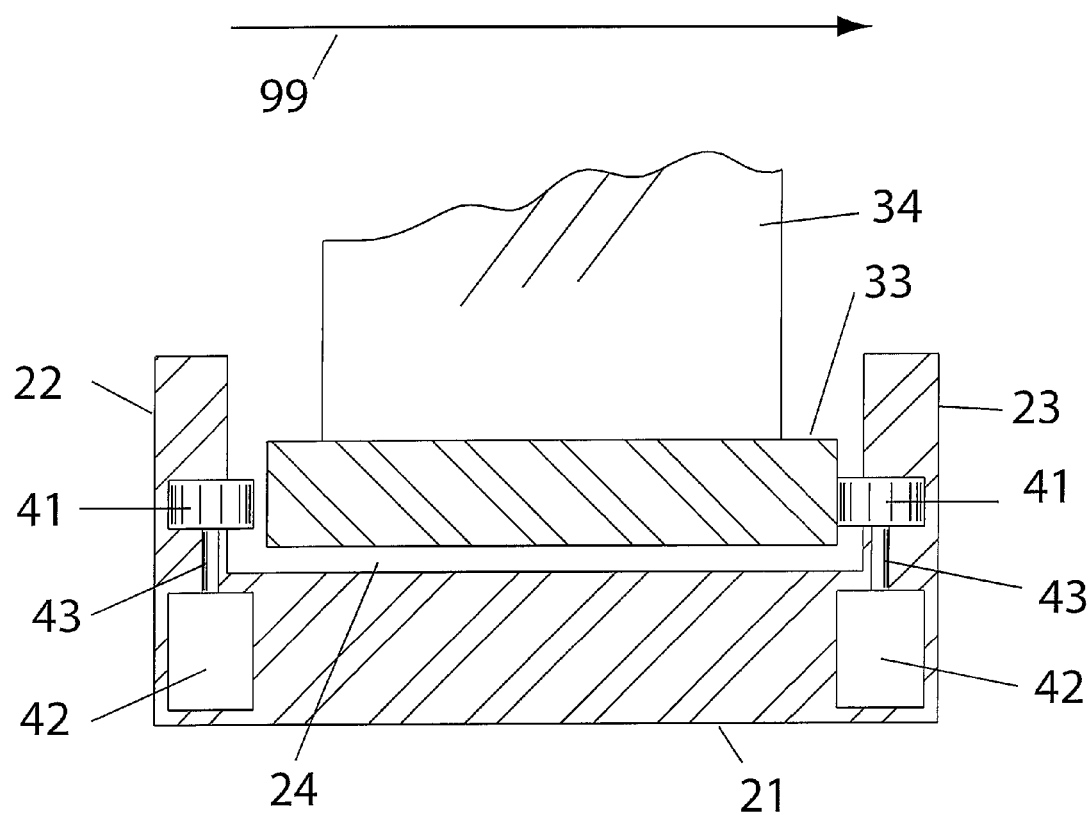
FIG. 5 is an alternative embodiment shown similarly to FIG. 3, where the anti-friction means comprises drive wheels transferring rotational energy to generators.
Figure 6:
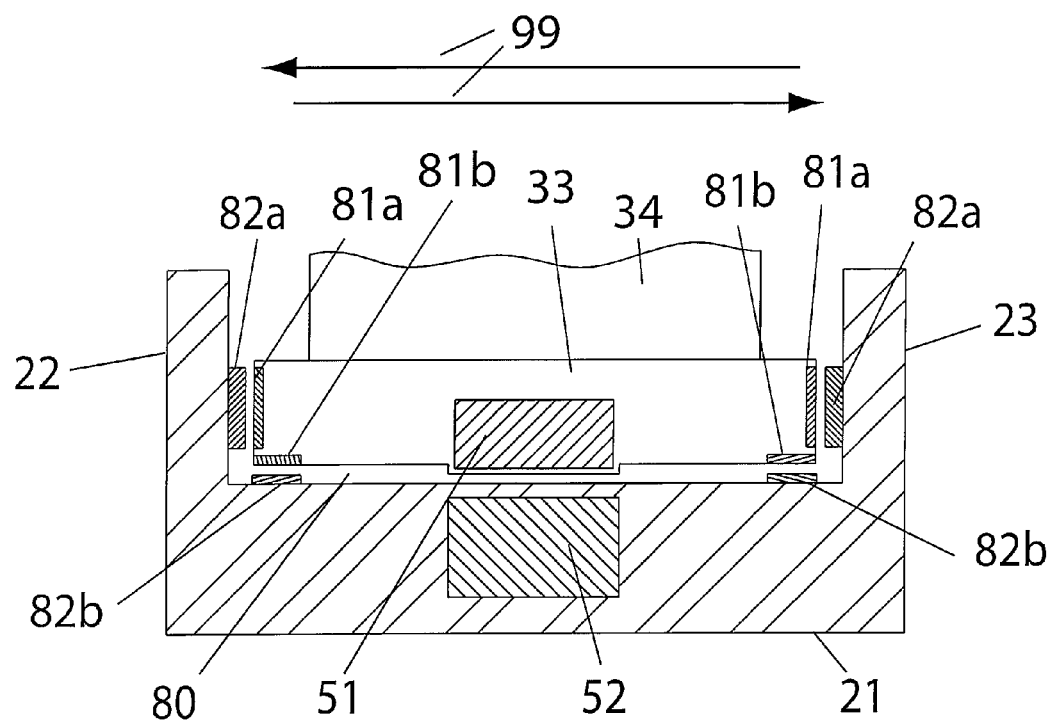
FIG. 6 is a partial cross-sectional view of the more preferred embodiment, wherein the bearings restricting movement in the axial directions are of increased thickness.
Figure 7:
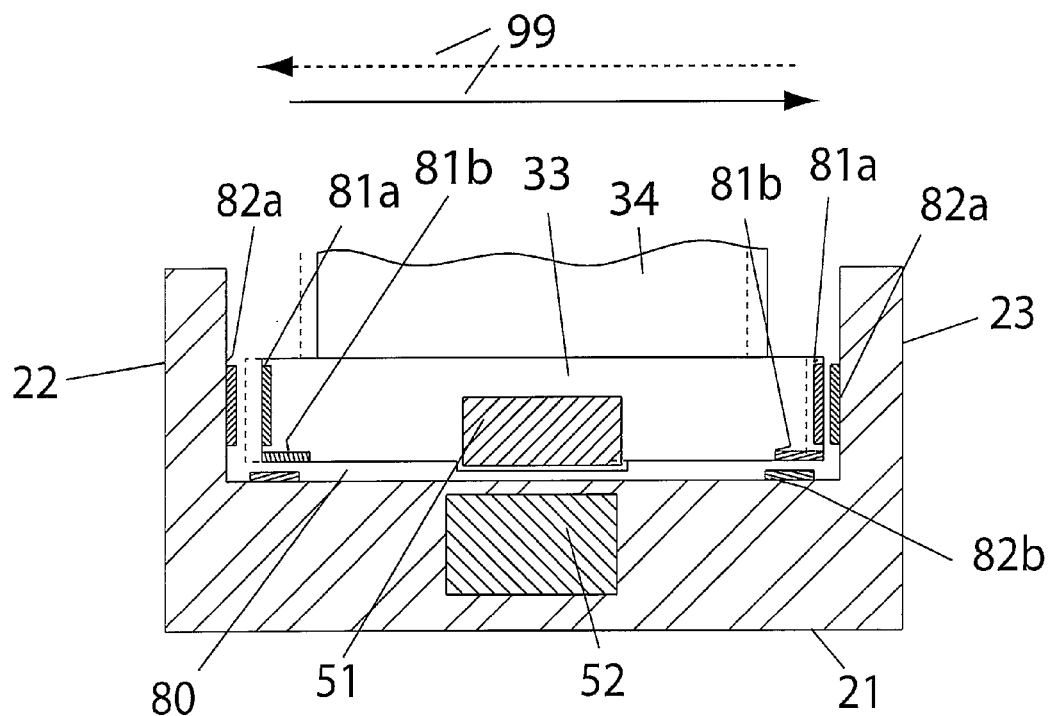
FIG. 7 is a partial cross-sectional view similar to FIG. 6, but showing the bearings in the worn condition and the rotor shifted in the direction of water flow.

The minimum distance between the flanges 22 and 23 is determined by the axial dimension of the outer rim 33, taking into account any anti-friction means such as journals 71a, 71b or bearings 72a, 72b disposed on the rotor 31 and housing 21, such that the rotor outer rim 33 can be received within the channel of the housing 21. In the embodiments shown in FIGS. 3 through 5, the interior distance between the retaining flanges 22 and 23, which defines the maximum travel distance of the rotor 31 in the axial direction, only slightly exceeds the dimension in the axial direction of the annular outer rim 33, such that axial shifting of the rotor 31 is allowed but remains relatively limited. In contrast, the distance between the flanges 22 and 23 in the axial direction of the embodiment shown in FIGS. 6 and 7 is significantly greater than the minimum distance required to receive the annular outer rim 33, such that greater movement of the rotor 31 in the axial direction is allowed.

The rotating assembly or rotor 31 comprises an inner annular rim member 32 and an outer annular rim member 33. Extending between inner rim 32 and outer rim 33 are a plurality of numbers or blade members 34, the blades 34 being angled or twisted in known manner such that movement of fluid in either of the axial tidal flow directions 99 results in rotation of the rotor 31. The particular number, configuration and material composition of the blades 34 may vary, but preferably the blades 34 are constructed to be as lightweight as possible without excessively sacrificing structural integrity.

The inner rim 32 defines a relatively large open center 35 that increases the effectiveness of the hydroelectric turbine 10 in low head conditions, since support for the rotor 31 is spread about the periphery of the outer rim 33 rather than being concentrated at a central shaft. This enables the housing 21 and rotor 31 to be constructed with a much larger diameter than possible with shaft mounted rotors, thereby allowing for a dramatic increase in the total surface area of the blade members 34, which enables the hydroelectric turbine 10 to function well in low head conditions.

Figure 3:
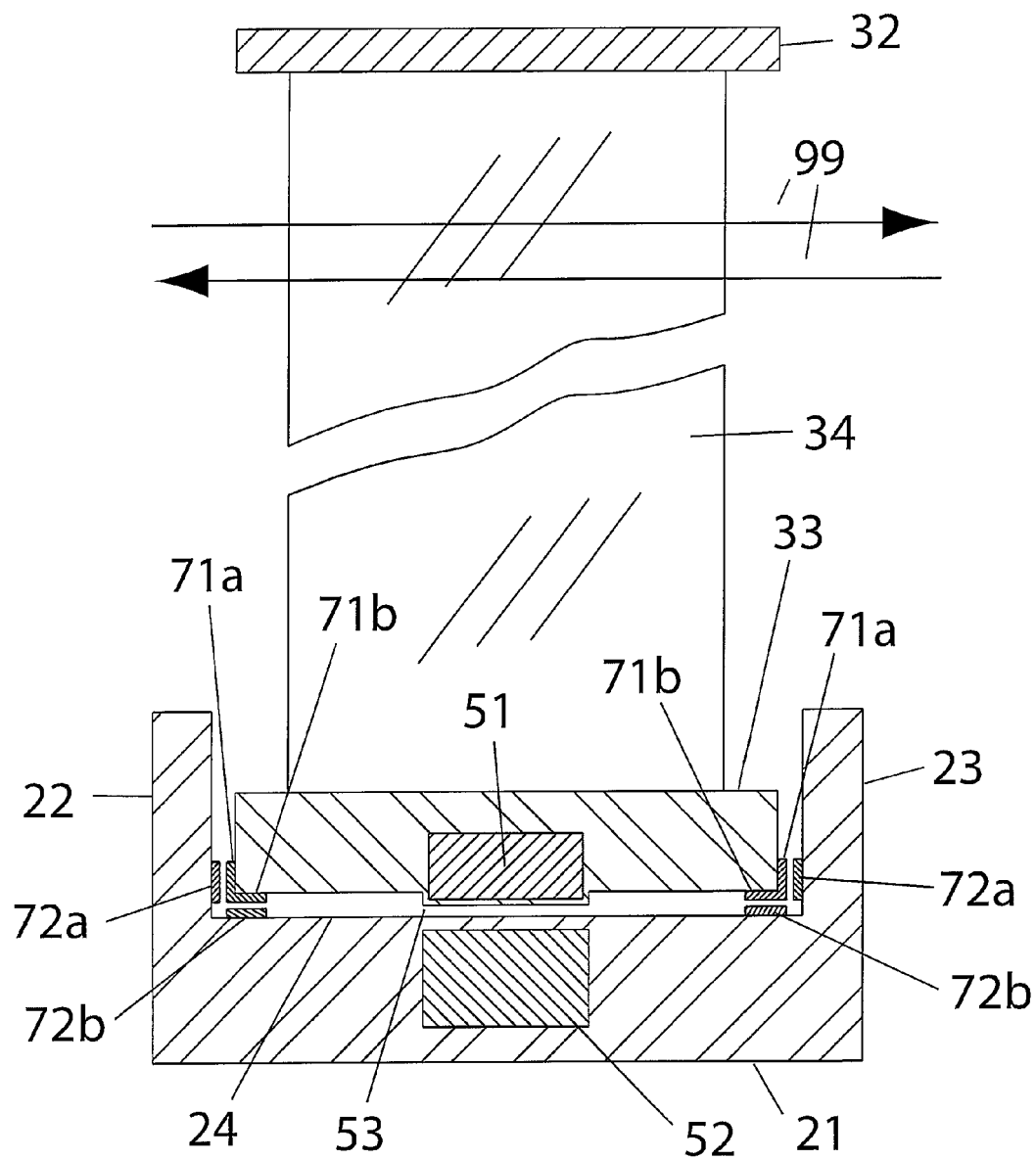
FIG. 3 is a partial cross-sectional view of a preferred embodiment, showing journals and marine bearing plates comprising the anti-friction means.

In the preferred embodiment as shown in FIG. 3, the housing 21 and rotor 31 in combination define a generator for the production of electricity. This may be accomplished by locating a plurality of magnets 51 about the outer periphery of the outer rim 33 and locating a plurality of coils 52 about the inner periphery surface 24 of the housing 21, such that the housing 21 becomes in effect the stator of a generator. Rotation of the rotor 31 passes the magnets 51 across the coils 52 and electricity is produced in known manner.

It is also important to provide anti-friction means to minimize frictional drag between the rotor 31 and the housing 21 in addition to the lubrication provided by the water itself. In a preferred embodiment, this is accomplished utilizing a combination of journal members 71a, 71b and bearings 72a, 72b, such as water lubricated marine bearing plates, as shown in FIG. 3. By positioning the bearings on the external rim of the rotor, the bearing surface is increased, and thus the pressure per square inch on the bearings reduces to the point that a water lubricated bearing can be utilized.

The journals 71a, 71b are shown as being mounted at the inflow and outflow edges of the outer rim 33 and the marine bearing plates 72a, 72b as being mounted on the interior periphery of the housing 21 and retaining flanges 22 and 23, but the positions could be reversed. It should be appreciated that the terms "inflow" and "outflow" are, in the present application, relative terms, which are dependent on the direction of flow of water through the turbine 10, which is bi-directional in nature. The same relativity will obviously also apply to such terms as "upstream" and "downstream" or the like. Axial journals 71a correspond to axial or thrust bearings 72a and together control movement of the rotor 31 in the axial direction. Radial journals 71b and radial bearings 72b in combination control movement in the radial direction. The journals 71a, 71b are composed of a relatively low friction material, such as stainless steel or the like, and the marine bearing plates 72a, 72b are likewise composed of a relatively low friction material, such as a polymer, e.g., Teflon, ceramic or the like. These components, as well as all components in the device, must be resistant to salt water and other environmental damage, as the use of the invention will typically expose the components to such elements, in particular given that tidal flow typically comprises salt water or brackish water. The journals 71a, 71b and marine bearing plates 72a, 72b in combination reduce friction and drag in the radial direction and both axial directions, such that rotation of the rotor 31 relative to the housing 21 is minimally impeded.

By permitting axial displacement of the rotor 31 in response to tidal flow in either direction, the anti-friction means on the upstream side of the turbine 10 are not in contact in the axial direction, and so will not undergo wear during operation of the turbine for the period during which the tidal is flowing in that direction. Once the tide reverses, the rotor 31 will be displaced axially against what was previously the upstream side of the housing 21, such that the anti-friction means on the new upstream side of the turbine 10 will not be contacted, and therefore will not undergo wear. This arrangement ensures that only the anti-friction means on one side of the turbine 10 will undergo wear at any give time, thus reducing the overall wear on the anti-friction means.

In a more preferred embodiment, as shown in FIGS. 6 and 7, the axial bearings 82a that restrict movement of the rotor 31 in the axial directions are initially of increased thickness, such that the interior distance between first and second retaining flanges 22 and 23 is significantly greater than the minimal distance necessary to retain the rotor 31 in the axial direction. This creates a short, cylindrical trackway 80 extending in the axial direction, allowing the rotor 31 to move axially within this trackway 80 in the same manner as a piston moves within a cylinder. When tidal flow 99 occurs in a first direction, the rotor 31 shifts in the direction of water flow, such that the low friction axial or thrust bearings 82a on the downstream side in combination with the axial journals 81 a limit the shift of the rotor 31 in that direction. When tidal flow 99 reverses to the second direction, the rotor 31 shifts to the opposite side, such that the low friction bearings 82a on the opposing side, which is now the downstream side, limit the shift of the rotor 31 in the second direction. This shifting of the rotor 31 in relation to the housing 21 can more easily occur because the rotor 31 is of the open center type, such that all retention occurs on the outer rim 33 as opposed to the type of turbine wherein the rotor is mounted onto a central shaft or axle, although it will be appreciated that such axial shifting could be implemented on a shaft based turbine. Over time, the oversize bearings 82a wear down due to friction effects. FIG. 7 illustrates a turbine 10 that has been in use for an extended time period, in that the axial bearings 82a have worn down significantly. With tidal flow 99 occurring in the left-to-right direction of the drawing, the rotor 31 shifts to the right. When the tidal flow 99 reverses, as shown by the dashed line, the rotor 31 shifts to the left. Because the housing 21 and axial bearings 82a are sized to allow for shifting movement of the rotor 31 in the axial directions and because the axial bearings 82a are of increased thickness such that working life of the bearings 82a is extended, the time between required maintenance and servicing based on the need to replace the bearings 82a is greatly extended. Thus the bearings 82a are designed to operate effectively even after significant wear in the axial direction. In particular, it is preferred that the turbine 10 can operate even if the bearings 82a have worn down, in the axial direction, in the range of 100%-10%, more preferably 100%-30%, and most preferably 100%-50% of the original thickness thereof. To accommodate the reciprocating axial shift of the rotor 31, it is preferable to provide extended or oversized radial bearings 82b relative to axial journals 81b in the axial direction. The magnet 51 and coil 52 combination is also structured to accommodate the axial shift without significant loss in production. An added feature of the axial shift of the rotor 31 relative to the housing 21 is that debris captured between the rotor 31 and the housing 21 is more readily flushed from the apparatus by the tidal currents, since expansion of the gap between the upstream flange 22 or 23 and the edge of the annular outer rim 33 allows increased current flow within that gap. Another positive feature is that less energy is required to initiate rotation of the rotor 31 from the stationary position, since rotation will begin prior to contact between the downstream anti-friction means and the outer rim 33.

Figure 4:
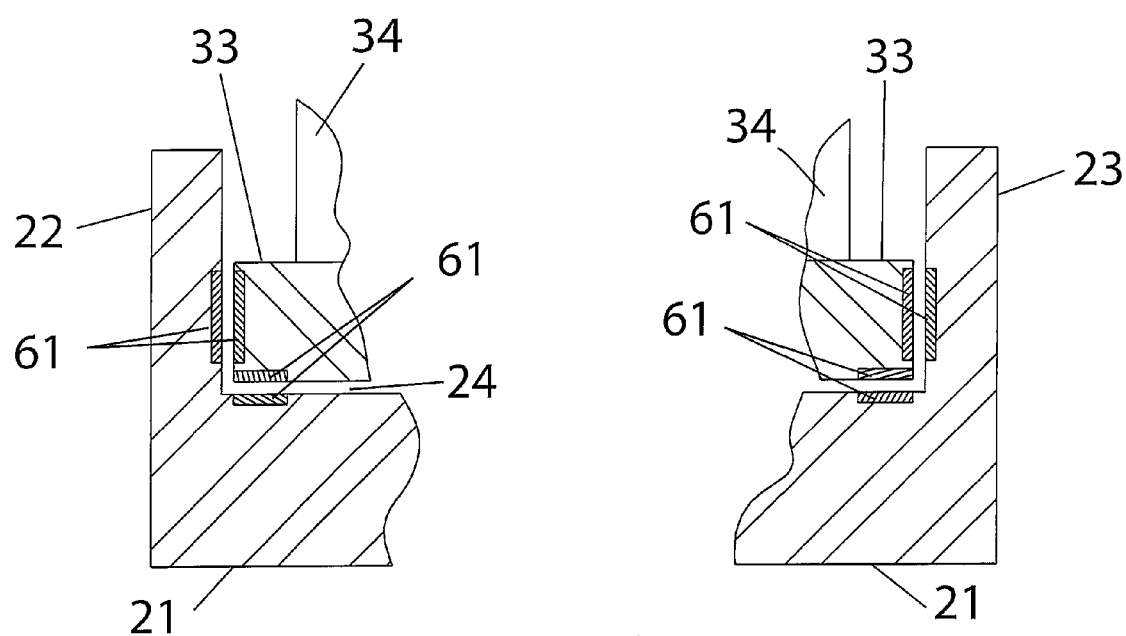
FIG. 4 is an alternative embodiment shown similarly to FIG. 3, wherein the anti-friction means comprises repelling magnets.

Alternatively, the anti-friction means may comprise sets of repulsing magnets 61 as shown in FIG. 4. The repulsing magnets 61 are mounted in pairs on the outer rim 33 and the interior periphery surface 24 of housing 21 and retaining flanges 22 and 23 with opposite poles facing each other within a given set, such that the repulsive magnetic force prevents contact between the outer rim 33 and the housing 21 and retaining flanges 22 and 23. In still another alternative embodiment, as shown in FIG. 5, mechanical means may be utilized as the anti-friction means— for example, rollers or other rotating bearings. In the embodiment shown, the anti-friction means comprise drive wheels 41 that are connected by shafts 43 to generator means 42, the rotation of the rotor 31 being directly transferred to the generator means 42 to produce electricity. This final embodiment is the least desirable, as it will be difficult to properly seal these components against fouling and degradation over time.

To produce electricity from tidal flow, one or more hydroelectric turbines 10 are positioned submerged or within the body of water subject to tidal influences, preferably in open water, such that water will flow in one direction through the rotor 31 during rising or incoming tides and further that water will flow through the rotor 31 in the opposite direction during falling or outgoing tides. As the tide rises, the rotor 31 is turned in a first direction and electricity is generated as described. As the tide falls, the flow of water reverses and the rotor 31 is turned in the opposite direction, again generating electricity. Because of the open-center construction, the relatively large blade surface area and the dispersal of the supporting forces for the rotor 31 relative to the housing 21 and retaining flanges 22 and 23, the rotor 31 can be rotated in low head conditions, such that tidal flow is sufficient to produce electricity.

It is to be understood that equivalents and substitutions for certain elements set forth above may be obvious to those skilled in the art, and therefore the true scope and definition of the invention is to be as set forth in the following claims.

The invention claimed is:

1. A turbine for producing electricity from bi-directional water flow in a first water flow direction and an opposite second water flow direction without reversing the position of said turbine relative to the water flow direction, comprising:
   a rotor comprising blades extending from an outer rim, said rotor capable of rotating in a first rotation direction and a second rotation direction;
   a housing configured to retain said rotor in an axial direction and a radial direction, said housing allowing, in use, said rotor to shift in either axial direction responsive to the bi-directional water flow, said housing including a first retaining member to retain said rotor in a first axial direction and a second retaining member to retain said rotor in a second axial direction;
   said outer rim and said housing both including anti-friction members arranged to reduce frictional drag between said housing and said rotor in both the axial direction and the radial direction when in use;
   wherein said housing is shaped and dimensioned such that the outer rim axially contacts said first retaining member and does not axially contact said second retaining member when in use in the first water flow direction, and such that the outer rim axially contacts said second retaining member and does not axially contact said first retaining member when in use in the second water flow direction.

2. The turbine of claim 1, wherein said first retaining member and said second retaining member comprise a first retaining flange and a second retaining flange.

3. The turbine of claim 1, wherein said anti-friction members comprise journals positioned on said outer rim and marine bearing plates positioned on said first retaining member and said second retaining member.

4. The turbine of claim 1, said housing further comprising an interior periphery surface between said first retaining member and said second retaining member, and wherein said anti-friction members on said housing are positioned on said first and second retaining members and said interior periphery surface.

5. The turbine of claim 4, further comprising magnets disposed in said outer rim and coils disposed in said interior periphery surface.

6. The turbine of claim 1, wherein said housing is shaped and dimensioned such as to permit, in use, said rotor to begin rotating from a stationary position prior to contact between a downstream side of said rim and said first retaining member or said second retaining member.

7. The turbine of claim 1, wherein said anti-friction members, in use, reduces drag between said outer rim and said first retaining member and said second retaining member.

8. The turbine of claim 1, wherein said anti-friction members comprise journals and marine bearing plates, wherein the amount of movement by said rotor in the axial direction increases as the thickness of said anti-friction members decreases from friction effects.

9. The turbine of claim 8, wherein said journals are composed of stainless steel and said marine bearing plates are composed of a low-friction polymer.

10. The turbine of claim 9, wherein said journals are positioned on said outer rim and said marine bearing plates are positioned on said first retaining member and on said second retaining member.

11. The turbine of claim 9, said housing further comprising an interior periphery surface, wherein said marine bearing plates are also positioned on said interior periphery surface.

12. The turbine of claim 1, said housing further comprising an interior periphery surface, and wherein magnets are disposed in said outer rim and coils are disposed in said interior periphery surface.

13. The turbine of claim 1, wherein said rotor comprises an inner rim defining an open centre, said blades being captured between the inner and outer rim.

14. The turbine of claim 1, wherein said anti-friction members comprise water lubricated marine bearing plates.

* * * * *